Oct. 4, 1949.  G. WEISS  2,483,954

PRESSURE REDUCING VALVE

Filed March 25, 1947  2 Sheets-Sheet 1

INVENTOR.
GERHART WEISS
BY
Greene & Durr
ATTORNEYS

Oct. 4, 1949.    G. WEISS    2,483,954
PRESSURE REDUCING VALVE
Filed March 25, 1947    2 Sheets-Sheet 2
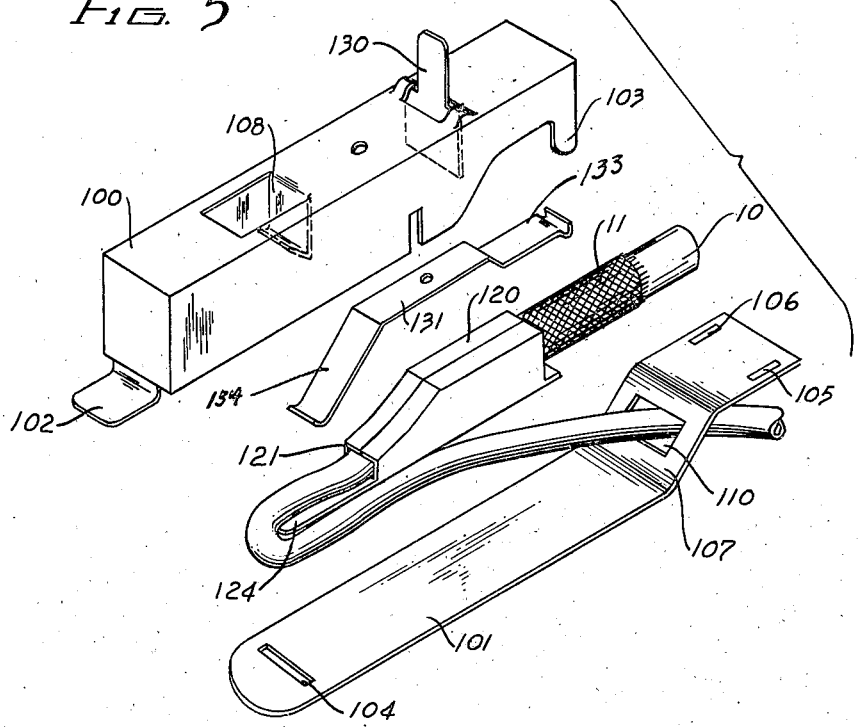
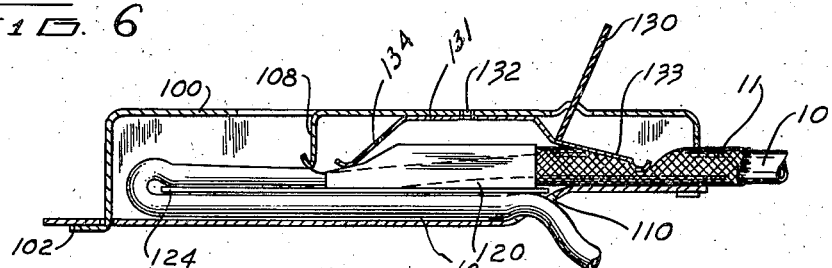
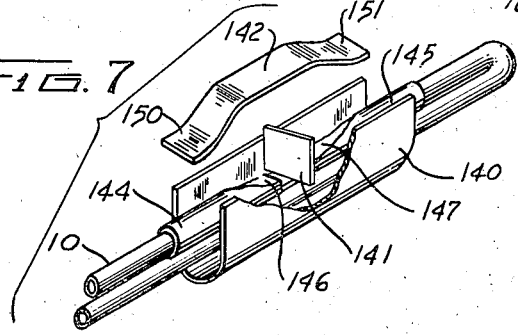
INVENTOR.
GERHART WEISS
BY
Greene & Durr
ATTORNEYS Patented Oct. 4, 1949

2,483,954

UNITED STATES PATENT OFFICE 2,483,954

PRESSURE REDUCING VALVE

Gerhart Weiss, Sunnyside, N. Y.

Application March 25, 1947, Serial No. 737,071

8 Claims. (Cl. 50—26)

This invention relates to a constant pressure valve. More particularly it relates to a valve adapted to receive a fluid from a varying high pressure source and deliver the fluid to a fluid employing mechanism at a substantially constant lower pressure.

An object of this invention is to produce a valve of a simple construction which is adapted to reduce the pressure of compressed gases to a substantially constant value.

Another object of the invention is to produce a valve adapted to reduce the pressure of compressed or liquified gases contained in cylinders in which the pressure varies as the cylinder is exhausted so as to obtain a substantially constant delivery pressure.

Another object of the invention is to provide a reducing pressure valve in which a flexible delivery tube, through which a fluid passes, actuates the valve to control the delivery pressure of the fluid.

These objects and others ancillary thereto are obtained by providing a flexible tube through which the fluid to be controlled is passed and by providing a long surface area of the tube in the low pressure side to actuate a lever which operates a knife edge to pinch the tube and adjust the fluid supply to thereby obtain a substantially constant fluid delivery pressure.

The device is useful wherever it is found desirable to reduce or control the pressure of a gas or fluid. For example, in employing compressed gases to actuate small air motors such as the air motor described and claimed in my copending application No. 685,218 filed July 20, 1946, compressed gas is fed from a cylinder to a gas motor. By inserting the valve of the present invention between the cylinder and the motor a constant pressure supply to the motor is obtained. When this is done the motor runs for a longer period of time on a given supply of gas because an excessive supply of gas to the motor at the start of the run due to the initial high pressure of gas in the cylinder is prevented. When employing gas stored in cylinders to run mechanical equipment the gas is originally under a very high pressure which must be reduced to prevent excessive loss of energy. Where gases are to be employed in chemical reactions or where oxygen is to be supplied to an oxygen tent it is sometimes necessary to reduce the pressure to a reasonable and constant value. The device of this invention can be employed for such purposes. The device can also be employed to regulate the supply of other fluids such as liquids.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

Figure 5 is an exploded view of a modified type of valve.

Figure 6 is the view of the device of Figure 5 exampled.

Figure 7 is a view of another modification.

Figure 1:
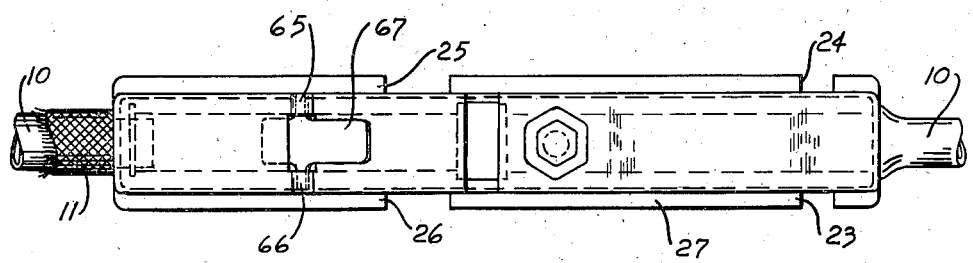
Figure 1 is a top plan view of one form of the invention.

In the drawings the tube 10 is supported on the high pressure side by the cotton fabric sleeve 11. The valve through which the tube extends has a bottom portion 13, a top 14 and sides 15 and 16. The top 14 and sides 15 and 16 are preferably made in one piece and the lower portion of the sides 15 and 16 contains detents 18, 19, 20, 21 and 22. These detents are insertable through slots in the bottom 13 and can be bent over to attach the bottom to the sides. Slots 23—26 are shown in Figure 1. A flange 27 may extend beyond the sides 15 and 16 to enable the device to be attached to a framework. The bottom 13 contains an indented portion 30 indented toward the inside of the valve for reasons to be described.

A chamber is formed in the valve by affixing the inverted U-shaped piece 31 (see Figure 2A) to the bottom. This inverted U-shaped piece 31 is attached to the bottom at 32, 33 and to the indented portion 30 at 34 and 35. The angle piece 31 is thus rigidly fixed to the bottom 13. This inverted U-shaped piece 31 encloses a flattened portion of the tube within the valve. The end of the inverted U-shaped piece 31 has a turned over end 36 and an up-turned notch 37 which forms a relatively simple hinge for the lever 40 to be described below. The inverted U-shaped piece 31 also has an extending portion 38 of slightly reduced size against which the tube 10 is adapted to be pressed.

The valve is actuated by the lever 40 which is a relatively long channel piece containing the sides 45 and 46. These sides 45 and 46 are for the purposes of strengthening the lever, but it it obvious that other strengthening means may be employed. The lever 40 is bent slightly at 41 and adjacent the bent portion is a depending portion 42 containing an orifice 43. The tube 10 and the end 38 of the inverted U-shaped piece 31 are adapted to extend through the orifice 43. One end of the lever 40 has an orifice 44 which is adapted to be pressed into the up-turned notch 37 so that the fulcrum of the lever 40 is formed by the hinge elements 36 and 37 of the angle piece 31.

The lever 40 is pressed downwardly by any suitable elastic means such as the spring 50. The spring 50 is adjustably held by a washer 51 which can be pressed downwardly by turning the screw 53 in the nut 52 which is attached to the top 14. The other end of the spring 50 is held on the button projection 47 of the lever.

Figure 2:
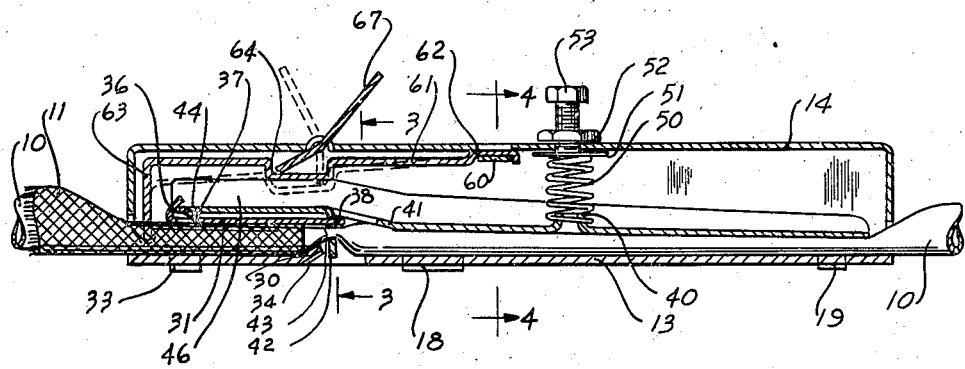
Figure 2 is a side cross sectional view of Figure 1.
Figure 3:
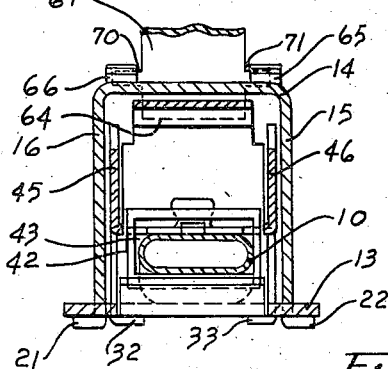
Figure 3 is a section taken on line 3—3 of Figure 2.
Figure 4:
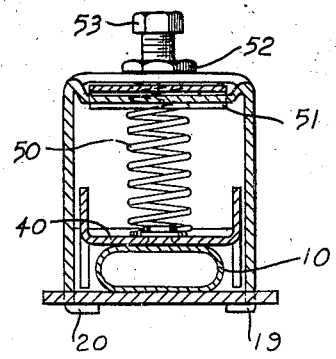
Figure 4 is a section taken on line 4—4 of Figure 2.
Figure 2A:
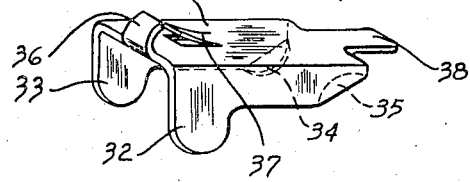
Figure 2A is a detail perspective view of one part of the device.

The valve operates as follows:

The fluid comes in at high pressure through the fabric supported end 11 and leaves at the other end of the valve. The tube is flattened in the valve so that the chamber in the valve through which the tube passes is substantially filled with the tube. The high pressure side of the tube extends from the orifice 43 in the lever to the left as shown in Figure 2 and the low pressure side extends from the orifice 43 to the right as shown in Figure 2. A considerable portion of the tube on the low pressure side presses against the lever 40. Increasing the pressure against the lever 40 on the low pressure side forces the lever to pivot about the fulcrum at 36, 37 and raises the bottom portion of the slot 43 to pinch the tube against the extending portion 38 of the angle piece 31. Since a large area of the low pressure part of the tube acts against the lever while the high pressure side acts only against the knife edge of the slot 43 the amount of fluid which passes through the tube is regulated by the pressure in the tube on the low pressure side. This pressure can be adjusted to any desired value by the screw regulating means 53.

A turn off means and safety valve is also provided in the device of Figure 2. This comprises a long piece 61 held in an indented portion 60 of the tube 14 at 62 and containing a downwardly extending angle at 63 which can be forced against the tube 10. The piece 61 contains a channel 64 in which a lever 67 is adapted to move. The top 14 contains indented bearings 65 and 66 adapted to hold the extending ends 70, and 71 of the lever 67. By moving the lever 67 from the point shown in full lines in Figure 2 to the position shown in the dotted lines, the supply of fluid to the valve is shut off. Since the piece 61 is made of spring metal and since the channel 64 is spaced from the angle 63 the device also acts as a safety valve. If the pressure in the tube on the high pressure side of the angle 63 becomes too great the angle 63 will be sprung up even though the lever 67 is in the position shown in the dotted lines of Figure 2.

A modification of the device is shown in Figures 5 and 6. This device comprises a top box-like portion 100 and a bottom 101. These two parts are attachable by cleats 102, 103, insertable in the slots 104, 105 and 106. The bottom 101 contains an angle portion 107 in which there is an orifice 110. The top box-like portion 100 contains a downwardly pressed knife edge 108. The tube from the supporting sleeve 11 passes through a stiff chamber means 120 which has an end 121 adapted to flatten the tube and a projecting portion 134 around which the tube is bent. The end 121 of the chamber 120 is adapted to extend into the box 100 just short of the knife edge 108. An emergency cut off means is also shown. The spring 131 is attached to the box 100 by the rivet 132 and this has an end 133 adapted to be pushed against the high pressure side of the tube by the lever 130 to act as a shut-off and safety valve.

The way in which the device of Figures 5 and 6 operates can be understood from an examination of Figure 6. The chamber 120 floats within the box 100. The fluid under pressure enters at the high pressure side containing a support 11 and leaves through the side containing the slot 110. Increasing pressure on the low pressure side pushes the chamber 120 upwardly so that the knife edge 108 presses against the tube 10 to decrease the amount of fluid passing through the low pressure side. The end 134 of spring 131 acts against the pressure in the lower bend of the tube 10 to regulate the pressure. A screw may be provided in the top of box 100 to adjust the position and the pressure in the spring end 134.

A very simply constructed valve modification is shown in Figure 7. In this figure the valve is built about a chamber of U-shaped across section 140. This U-shaped chamber holds the bent tube 10, and has a knife edge 141 and a spring portion 142 attached thereto. The upper portion of the tube 10 in Figure 7 includes the high pressure side and the tube adjacent the high pressure side contains two stiff sleeves 144 and 145. The ends of these two sleeves are spaced apart at the point where the knife edge 141 is attached and the sleeves 144 and 145 are flattened near the ends which are adjacent as shown at 146 and 147. Increase in pressure on the low pressure side of the tube pushes against the stiff sleeves 144 and 145 forcing that portion of the tube between the sleeves against the knife edge 141. The sleeves 144 and 145 are forced downward by the elastic spring material 150 and 151 of the double leaf spring 142 which is attached to the U-shaped chamber only at its center portion.

Although certain specific embodiments of this invention have been shown and described, it will be understood that many modifications thereof are possible. This invention, therefore, is not to be restricted except insofar as is necessitated by the prior art and by the spirit of the appended claims.

I claim:

1. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a movable stiff member associated with a considerable length of the low pressure side of the tube so that increase in pressure on the low pressure side causes the stiff member to be moved by expansion of the tube, means for regulating the supply of fluid located between the low pressure side and the high pressure side of the tube, and means associated with the movable member to operate the fluid regulating means.

2. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a movable stiff member associated with a considerable length of the low pressure side of the tube so that increase in pressure on the low pressure side causes the stiff member to be moved by expansion of the tube, a knife edge member between the low pressure side and the high pressure side of the tube, means for holding the knife edge member so that movement of the movable stiff member caused by a change in pressure on the low pressure side of the tube causes the knife edge to pinch the tube and regulate the amount of fluid being fed to the low pressure side.

3. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a housing surrounding a portion of said tube, a movable stiff member associated with a considerable length of the low pressure side of the tube within said housing so that increase in pressure on the low pressure side causes the stiff member to be moved by expansion of the tube, a knife edge member between the low pressure side and the high pressure side of the tube, means for holding the knife edge member so that the low pressure side of the tube causes the knife edge to pinch the tube and regulate the amount of fluid being fed to the low pressure side.

4. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a housing surrounding a portion of said tube, a tube enclosing member rigidly attached to said housing at the end thereof which surrounds the high pressure side of the tube, a lever pivotally connected at its fulcrum to said tube enclosing member and having one side extending along a considerable portion of the low pressure side of the tube, and a tube pinching means associated with said lever whereby movement of the lever by expansion or contraction of the low pressure side of the tube regulates the flow of fluid to the low pressure side of the tube.

5. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a housing surrounding a portion of said tube, a tube enclosing member rigidly attached to said housing at the end thereof which surrounds the high pressure side of the tube, a lever pivotally connected at its fulcrum to said tube enclosing member and having one side extending along a considerable portion of the low pressure side of the tube, means forcing the lever against the low pressure portion of the tube, and a tube pinching means associated with said lever whereby movement of the lever by expansion or contraction of the low pressure side of the tube regulates the flow of fluid to the low pressure side of the tube.

6. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a housing surrounding a portion of said tube, a tube enclosing member rigidly attached to said housing at the end thereof which surrounds the high pressure side of the tube, a lever pivotally connected at its fulcrum to said tube enclosing member and having one side extending along a considerable portion of the low pressure side of the tube, means forcing the lever against the low pressure portion of the tube, and a knife edge connected to said lever adapted to pinch the tube against a portion of the chamber whereby movement of the lever by expansion or contraction of the low pressure side of the tube regulates the flow of fluid to the low pressure side of the tube.

7. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a housing surrounding a portion of said tube, a movable stiff member within the housing associated with a considerable length of the low pressure side of the tube so that increase in pressure on the low pressure side causes the stiff member to be moved by expansion of the tube, a knife edge attached to said housing so that expansion of the low pressure side of the tubing moves the tube against the knife edge.

8. In a valve for reducing and regulating the pressure of a fluid to be delivered to a fluid operated device, the structure comprising a flexible tube having a high pressure side to which fluid under relatively high pressure is adapted to be fed and a low pressure side which is connectable to a fluid operated device, a housing surrounding a portion of said tube, which is bent upon itself, a movable stiff member within said housing and between the bent portions of the tube, one of said bent portions of the tube including the high pressure side and the other bent portion consisting of a portion of the low pressure side of the tube, the low pressure side of the bent tube bearing against the wall of the housing so as to move the movable stiff member upon a change of the pressure therein, the high pressure side of the bent tubing being held away from the wall of the housing by a knife edge so that movement of the movable member by a change in pressure in the low pressure bent portion of the tube moves the other portion of the tube toward or away from the knife edge.

GERHART WEISS.

REFERENCES CITED

The following references are of record in the file of this patent:

UNITED STATES PATENTS

| Number | Name | Date |
| --- | --- | --- |
| 726,962 | Metzger | May 5, 1903 |
| 994,167 | Koppitz | June 6, 1911 |
| 1,120,002 | Walquist | Dec. 8, 1914 |